July 15, 1952 V. E. ROTSCH 2,603,475
MANUALLY OPERATED CUTTING TORCH MACHINE
Filed Aug. 26, 1946
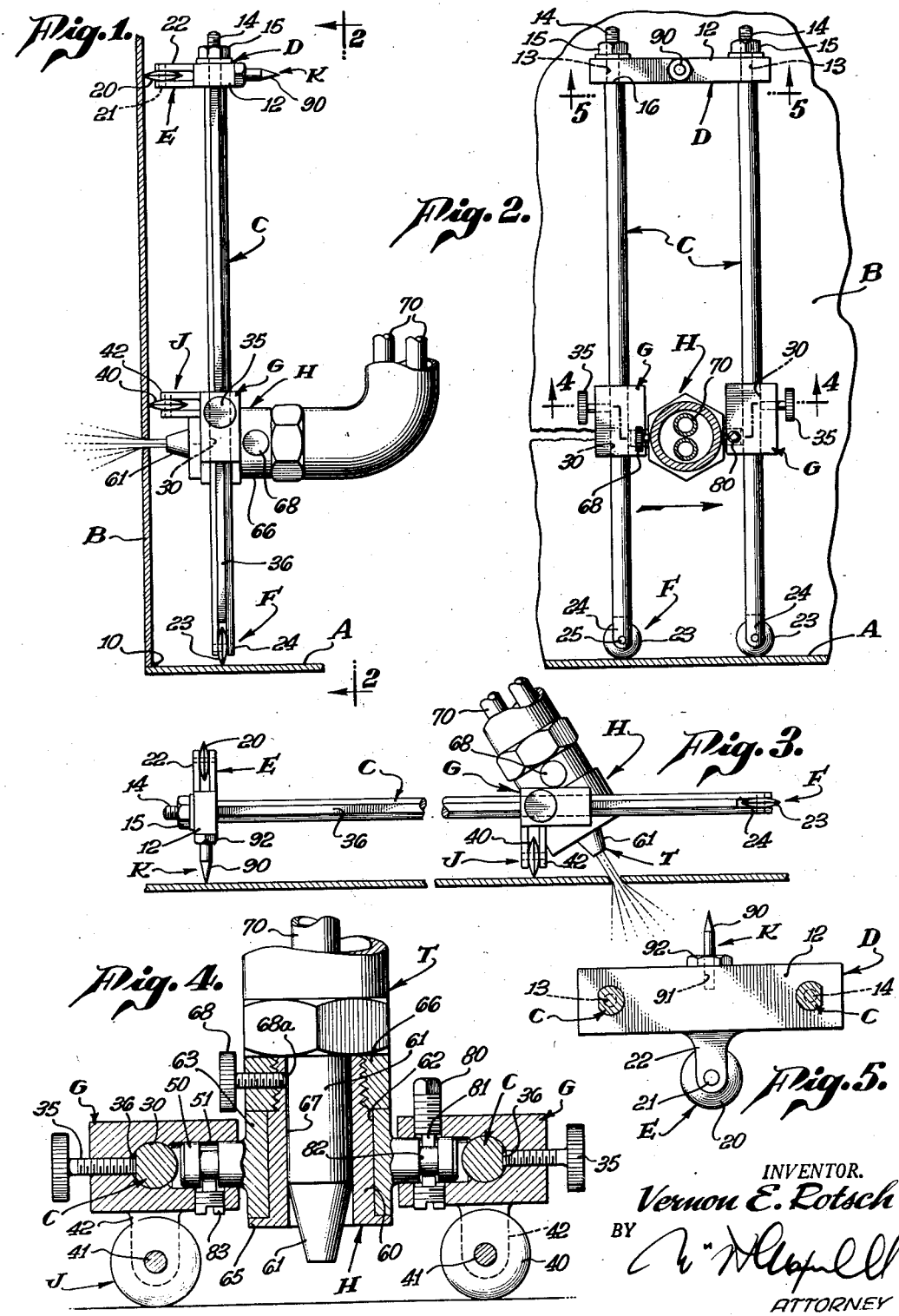
INVENTOR.
Vernon E. Rotsch
BY
ATTORNEY

Patented July 15, 1952

2,603,475

UNITED STATES PATENT OFFICE 2,603,475

MANUALLY OPERATED CUTTING TORCH MACHINE

Vernon E. Rotsch, Whittier, Calif.

Application August 26, 1946, Serial No. 693,134

15 Claims. (Cl. 266—23)

This invention relates to a guide for a manually operated cutting torch and it is a general object of the invention to provide a simple, accurate, easily operated torch guide having a wide range of use.

There are many situations where cuts are to be made in metal plates or structure by cutting torches and where the methods and equipment commonly used are slow, cumbersome and costly. In many cases careful layout operations are performed before cuts are made and it is common to install special paraphernalia such as rails or guide tracks, to handle a heavy traction type burning machine. Such rails and machines are rather difficult to handle and are not altogether accurate or satisfactory.

It is a general object of the present invention to provide a simple practical easily operated carriage for a manually operated cutting torch which carriage acts to effectively guide the torch relative to two elements such as a base and a part or wall projecting therefrom, and which may also be guided by a template which may be made of wood or metal. The carriage of the present invention can be used to advantage where a wall, or the like, projects from a floor or deck and where it is desired to cut either the floor or the deck along a line spaced a predetermined distance from the other element.

I will, in the following description, refer to a situation such as I have just mentioned and will describe a form of the invention that can be used to advantage in such a case but I do not wish it understood that the invention is, in its broader aspects, limited either to such specific use or to the particular form that I set forth.

A general object of the present invention is to provide a torch carriage of the general character referred to having three spaced bearing points or means of support so that it is stable and accurate. It is preferred to equip the carriage with supporting wheels at the points of bearing or support so that it operates smoothly and with a minimum of effort.

Another object of the present invention is to provide a torch carriage of the general character referred to having a torch carrying head adjustable to various angles so that it is effective in supporting a torch at various angles relative to the work being cut.

A further object of the present invention is to provide a torch carriage of the general character mentioned involving a simple, improved arrangement and combination of parts making the carriage inexpensive of manufacture and practical and convenient to use.

The various objects and features of my invention will be fully understood from the following detailed descripiton of a typical preferred form and application of the invention, throughout which description reference is made to the accompanying drawings, in which:

Fig. 1 is a side elevation of the torch carriage provided by the present invention, illustrating a typical manner in which it may be used in connection with two angularly related parts such as a deck and a wall or a bulkhead. Fig. 2 is a view taken as indicated by line 2—2 on Fig. 1. Fig. 3 is a view showing another applicaiton of the carriage and illustrating the carriage used to carry a torch in a circular path and showing the manner in which the structure is operable to carry a torch at an angle relative to the part being cut. Fig. 4 is an enlarged detailed sectional view taken substantially as indicated by line 4—4 on Fig. 2, and Fig. 5 is an enlarged detailed transverse sectional view taken as indicated by line 5—5 on Fig. 2.

The carriage that I have provided may be used in various ways, it being common to use it to make either an elongate or a circular cut in a plate or structural part. The carriage may be used to advantage in making irregular cuts in a horizontal position in which case it may be guided by a template or mold. In Figs. 1 and 2 of the drawings I have indicated the manner in which the carriage can be used when it is desired to make an elongate cut, whereas in Fig. 3 I show it arranged or in use making a circular cut. In Figs. 1 and 2 I show the structure or carriage in use in connection with two elements that are angularly related to each other, for instance, in connection with what may be a deck A and a wall or bulkhead B. The deck A is shown as a flat horizontally disposed part while the bulkhead B is a vertically disposed part projecting upwardly from the deck and joined thereto as by a weld at 10.

The carriage that I have provided involves, generally, a pair of spaced parallel guide rods C, a head or spreader D between and joining the bars at one end of the structure, supporting means E carried by the spreader, supporting means F carried by the rods at the ends of the rods remote from the spreader, slide blocks G carried on the rods to be shiftable lengthwise thereof, a head or torch holder H carried by and between the slide blocks, supporting means J carried by the guide blocks and supporting means K carried by the spreader. The slide blocks G and the head H are, in accordance with the present invention, related so that they form an assembly which is in the nature of a cross head shiftable or slidable lengthwise of the frame established by the guide rods and it is this cross head that carries the cutting torch.

The guide rods C establish or form an elongate frame-like structure which is preferably straight and which may, in practice, be of any suitable length. In the form of the invention illustrated the rods C are in the form of round bars or stock and are of corresponding length, being such as to extend continuously from the spreader D to the means F. The rods C are joined or anchored to the spreader so that they are positively maintained in the desired spaced relationship at the spreader and they are maintained in this relationship remote from the spreader by the crosshead construction formed by the blocks G and head H.

The spreader D may be formed by a simple cross bar 12 to which the ends of the rods C are secured. In the case illustrated the cross bar is shown provided with bores 13 that receive reduced end portions 14 of the rods and nuts 15 are threaded onto the reduced parts 14. When the nuts are tightened onto the parts 14 the shoulders 16 formed by the reduced parts bear tight against the cross bar, with the result that a rigid connection is established.

The supporting means E in connection with or carried by the spreader D preferably involves a single bearing member in the form of a single roller 20, and in the case illustrated this roller is shown carried on a pivot pin 21 carried between a pair of spaced arms 22 that project from the spreader bar forming a yoke-like structure in which the roller 20 is confined. The arms 22 project from one side of the cross bar or in a direction transverse of or normal to the longitudinal axis of the frame formed by the rods C. Where a single supporting roller 20 is provided I prefer that it be located at the middle of the cross bar, or in other words, midway between the points where the guide rods connect to the spreader as I have shown in Fig. 5 of the drawings.

The supporting means F involves supporting rollers 23 located at the ends of the rods C remote from the ends that connect to the spreader. In the particular construction illustrated each rod C is bifurcated at its remote or outer end to form arms 24 between which a roller 23 is carried on a pivot pin 25. In accordance with the preferred arrangement or relationship of parts the axis of the roller 20 of means E extends parallel with the guide rods C whereas the axes of the rollers 23 are parallel to each other and normal to the direction in which the rods extend and are normal or perpendicular to the plane in which the rods C lie.

With the general arrangement or construction thus far described the carriage is insertable between elements such as the parts A and B above described, so that the supporting means E spaces the frame formed by the rod C away from the member B while the spaced rollers of means F stabilize the frame formed by the rods C holding it perpendicular to the plane of the element or member A.

The slide blocks G are preferably simple block-like members or parts provided with longitudinal openings or bores 30 to slidably pass the rods C, the block being made long enough so that there is adequate bearing engagement between the blocks and the rods. The blocks are located in line with each other or opposite each other, as shown throughout the drawings, and are proportioned so that they are spaced apart far enough to adequately accommodate the head H. In the case illustrated I show a set screw or clamp device 35 carried by each block G so that it is operable to be clamped or set against the rod which supports the block. In the particular case illustrated the rods are provided with flat sides 36 against which the set screws 35 clamp or bear. When either one or both of the set screws 35 is made fast the carriage formed by the head H combined with the blocks G is set against longitudinal movement lengthwise of the frame formed by the rods C.

The supporting means J in connection with the blocks G involves a supporting roller 40 carried by each block, the rollers being carried on pivot pins 41 supported by spaced arms 42 which project from the blocks. The arms 42 project from the blocks in the same direction that the arms 22 project from the cross bar and the pivot pins 42 are on axes parallel with that of the pivot pin 21. In practice it is preferred to relate supporting means E and J so that they act to support the frame formed by the rod C parallel with the member B as shown throughout the drawings.

The head H is accommodated or fits between the blocks G and is the element of the structure which holds the cutting torch T. In accordance with my construction the head H has trunnions 50 projecting from opposite sides which trunnions are in alignment or on a common axis and extend into sockets 51 provided in the inner sides of the blocks G. The trunnions are rotatably supported in the sockets 51 and they extend far enough into the sockets so that they have effective bearing engagement therein with the result that the head is effectively pivotally supported between the blocks G on an axis transverse of the longitudinal axis of the frame formed by the rods C, which axis is parallel with the member B when the carriage is in operating position, as shown in Figs. 1 and 2 of the drawings.

The head H, being the torch holding element of the carriage, is fitted or provided with means for effectively engaging the torch T. In the preferred form of the invention the head includes a collar 60 applicable to a part or torch T, for instance, to the tip portion 61 of the torch, which collar is ratatably carried in a bore 62 provided in the body portion 63 of the head. The bore 62 extends completely through the body 63 of the head and is transverse of the axis of the trunnions 50, it being preferred that it be located to intersect the axis of the trunnions 50. The collar 60 is rotatably supported in the bore 62 and is confined or held in the desired position relative to the body 63 by a fixed flange 65 at one end of the collar and a removable flange 66 at the other end of the collar. With the construction that I have provided the collar 60 is confined in the head 63 against axial movement, but is free to rotate. The bore or opening 67 provided in the collar 60 is made to slidably receive a suitable portion of the torch T, for instance, the top portion 61 thereof, and the collar is preferably provided with a set screw 68 that extends through an opening 68a in the part of the collar 60 on which the collar 60 is threaded and can be operated to clamp the tip portion of the torch in the collar. In the case illustrated the set screw 68 is shown carried by the removable flange portion 66 of the collar.

With the construction just described the operator can set the tip portion 61 of the torch in the collar 60 with the end of the torch any suitable distance from the work or element B and the torch is rotatably supported so that it is free to turn or work around as the device operates, preventing kinking or twisting of the conduits 70 employed to supply fuel to the torch, and allowing the operator to shift the torch to various positions without disturbing the cut being made.

In accordance with the preferred form of the invention I provide stop or set means in the form of a set screw 80 or the like for setting the trunnions 50 against rotation in the sockets 51. In the drawings I have shown a set screw 80 carried by one of the blocks G and the set screw 80 has a tip 81 adapted to clamp against the bottom of a groove 82 formed in one of the trunnions. I may, if desired, provide means for retaining the trunnions in the sockets, in which case a groove 82 may be provided in each trunnion and a retainer 83 may be carried by each block to have a part projecting into a groove 82 as shown in Fig. 4.

The centering means K is carried by the spreader and may be employed when desired as a means for centering the carriage, enabling the carriage to be operated in a circle rather than lengthwise, as indicated in Figs. 1 and 2 of the drawings. The centering means K as shown in the drawings may involve a suitably shaped center pin 90 threaded into a socket 91 in the cross bar so it can be readily renewed or replaced and a lock nut 92 or the like may be provided for setting the pin in the desired adjusted position. When the centering means K is being employed, as shown in Fig. 3, the spreader formed by the cross bar 12 is reversed or turned around on the frame formed by the rods C so that the supporting means J carried by the blocks G cooperate with the centering means K in supporting the frame in a predetermined position above the surface over which the carriage operates.

When the parts are set, as shown in Fig. 3, the centering means K forms a pivot point about which the entire frame can turn and the frame will turn or swing freely in that it will roll freely on the rollers 40 of means J. In Fig. 1 the head H is shown set so that the torch T faces directly at the element being acted upon or so that it is at right angles to the work, whereas in Fig. 3 it is shown set at an angle or tilted, in which case it will make an angular cut as clearly shown in the drawings.

From the foregoing description it will be apparent that I have provided a torch carriage which can be used in various manners. When it is used as shown in Figs. 1 and 2 of the drawings the supporting means E, F and J establish three distinct locations at which the carriage is supported, and since the means F and J both involve spaced rollers they serve to stabilize the carriage in two different directions with the result that the carriage is supported to roll or move freely and yet it is held stable so that the frame formed by the rod C is maintained in its desired relationship to the surface being acted upon the torch. It will be apparent that the means E and J maintain the torch properly spaced from the work while the means F rolling along the member A will guide the carriage so that the torch cuts at a predetermined distance from the member A. Through adjustment the torch can be spaced from the work in the most advantageous manner and by adjusting the carriage formed by the blocks G and head H along the frame formed by the rod C the line of cut can be made at any desired point. It is to be observed that the structure that I have provided is simple and involves very few and easily operated parts, making the device practical and convenient for general use.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A torch carriage including, an elongate frame having spaced parallel rods, a spreader at one end of the frame extending between the rods and holding them spaced apart, a carriage slidable longitudinally of the frame and including a torch holder, and supporting means for the frame including a work engaging guide part carried by the spreader, a work engaging guide part carried by the carriage and faced in the same direction as the first named guide part to cooperate therewith in engaging a common work surface, and a work engaging guide part carried by the other end of the frame, the last mentioned guide part being faced at an angle to the other guide parts to cooperatively engage work at an angle to work engaged by said other guide parts.

2. A torch carriage operable relative to an element of work including, an elongate frame having two spaced parallel rods and a rigid spreader extending between the rods at one end of the frame spacing the rods apart, a carriage directly engaged with and slidable longitudinally on the rods and including a torch holder, and supporting means for the frame including a single work engaging roller on the spreader and projecting therefrom, a pair of work engaging rollers on the carriage and projecting therefrom and a pair of work engaging rollers on the ends of the rods remote from the spreader and projecting therefrom.

3. A torch carriage including, an elongate frame including two spaced parallel rods, a spreader at one end of the frame holding the rods apart, a carriage slidable longitudinally on the rods and including a torch holder, and supporting means for the frame including a roller carried by the spreader, a roller carried by the carriage and a roller on each rod at the other end of the frame.

4. A torch carriage including, an elongate frame including two spaced parallel rods, a spreader at one end of the frame holding the rods apart, a carriage slidable longitudinally of the frame and including a torch holder, and supporting means for the frame including a roller carried by the spreader, a roller carried by the carriage and a roller carried by the other end of the frame, the carriage including blocks slidable along the rods and a head pivotally carried between the blocks on an axis normal to the axes of of the rods.

5. A torch carriage including, an elongate frame including two spaced parallel rods, a spreader at one end of the frame, a carriage slidable longitudinally of the frame and including a torch holder, and supporting means for the frame carried by the spreader, the carriage and the other end of the frame, the carriage including blocks slidable along the rods and a head pivotally carried by the blocks and between the rods, the torch holder being rotatably carried by the head on an axis normal to the axes of the rods and intersecting the first mentioned axis.

6. A torch carriage engageable with work and including, an elongate frame having two spaced parallel rods, a spreader on one end of the frame holding the rods in spaced relationship, a carriage engaged on the frame and slidable longitudinally of the frame and including a torch holder, work engaging means for the frame carried by the spreader and projecting therefrom laterally of the frame, work engaging means for the frame carried by the carriage and projecting laterally of the frame, and work engaging means for the frame carried by the other end of the frame and projecting therefrom longitudinally of the frame.

7. A torch carriage including, an elongate frame having two spaced parallel rods, a spreader at one end of the frame extending between and holding the rods in spaced relationship, a carriage engaged with the slidable longitudinally of the frame and including a torch holder, a single supporting roller carried by the spreader on an axis parallel with the frame, two spaced supporting rollers carried by the carriage and having axes parallel with that of the said single supporting roller, and two spaced supporting rollers carried by the other end of the frame on axes parallel to each other and angularly related to the axes of the rollers on the carriage and spreader.

8. A torch carriage including, an elongate frame having spaced parallel rods, a spreader extending between the rods at one end of the frame and holding the rods fixed relative to each other, a carriage engaged with and slidable longitudinally of the frame and including a torch holder, a single supporting roller carried by the spreader on an axis parallel to the longitudinal axis of the frame, two spaced supporting rollers carried by the carriage on spaced parallel axes parallel with that of the said single roller, and two spaced supporting rollers carried by the frame on spaced parallel axes normal to the longitudinal axes of the frame.

9. A torch carriage engageable with the surface of a unit of work and including, an elongate frame having spaced parallel rods, a spreader at one end of the frame holding the rods apart, and a carriage slidable along the frame including a block slidable on each rod and a head carried by and between the blocks including a body between the blocks, trunnions projecting from the body and rotatably supported in sockets in the blocks on an axis normal to the longitudinal axis of the frame and substantially parallel with the surface of the work, and a torch carrying collar rotatably supported by the body on an axis normal to the first mentioned axis and adapted to receive and support a torch nozzle with its discharge end faced laterally of the frame.

10. A torch carriage engageable with the surface of a unit of work including an elongate frame having spaced parallel rods in a plane substantially parallel with that of said surface, a spreader at one end of the frame connecting the rods, and a carriage slidable along the frame including a block slidable on each rod and a head carried by and between the blocks including a body between the blocks, trunnions projecting from the body and rotatably supported in sockets in the blocks on an axis normal to the longitudinal axis of the frame and parallel with the plane of the rods, and a torch carrying collar rotatably supported in a bore extending transversely through the body.

11. A torch carriage engageable with the surface of a unit of work including an elongate frame having spaced parallel rods in a plane substantially parallel with that of said surface, a spreader at one end of the frame connecting the rods, and a carriage slidable along the frame including a block slidable on each rod and a head carried by and between the blocks including a body between the blocks, trunnions projecting from the body and rotatably supported in sockets in the blocks on an axis normal to the longitudinal axis of the frame and parallel with the plane of the rods, clamp means for setting the body against turning relative to the blocks, and a torch carrying collar rotatably supported by the body.

12. A torch carriage engageable with the surface of a unit of work including an elongate frame having spaced parallel rods in a plane substantially parallel with that of said surface, a spreader at one end of the frame connecting the rods, a carriage slidable along the frame including a block slidable on each rod and a head carried by and between the blocks including a body between the blocks, trunnions projecting from the body and rotatably supported in sockets in the blocks on an axis normal to the longitudinal axis of the frame and parallel with the plane of the rods, and a torch carrying collar rotatably supported by the body, and means for setting the carriage against movement along the frame.

13. A torch carriage engageable with the surface of a unit of work including an elongate frame having spaced parallel rods in a plane substantially parallel with that of said surface, a spreader at one end of the frame connecting the rods, a carriage slidable along the frame including a block slidable on each rod and a head carried by and between the blocks including a body between the blocks, trunnions projecting from the body and rotatably supported in sockets in the blocks on an axis normal to the longitudinal axis of the frame and parallel with the plane of the rods, clamp means for setting the body against turning relative to the blocks, and a torch carrying collar rotatably supported by the body, and means for setting the carriage against movement along the frame.

14. A torch carriage including an elongate frame including two spaced parallel rods, a spreader at one end of the frame holding the rods apart, a carriage slidable longitudinally of the rods and including a torch holder, roller supports carried by the spreader and by the carriage, one of the supports including a pair of spaced rollers, and a supporting roller carried by each rod at the other end of the frame.

15. A torch carriage including an elongate frame including, two spaced parallel rods, a spreader at one end of the frame holding the rods apart, a carriage slidable longitudinally of the rods and including a torch holder, roller supports for the frame carried by the spreader and by the carriage and having rollers with parallel axes extending longitudinally of the frame, one of the supports including a pair of spaced rollers having axes parallel with the longitudinal axis of the frame, and a supporting roller carried by each rod at the other end of the frame on spaced axes normal to the longitudinal axes of the frame.

VERNON E. ROTSCH.

(References on following page)

REFERENCES CITED

The following references are of record in the file of this patent:

UNITED STATES PATENTS

| Number | Name | Date |
|---|---|---|
| 988,950 | Rossell | Apr. 4, 1911 |
| 1,141,560 | Lack | June 1, 1915 |
| 1,172,933 | Bucknam | Feb. 22, 1916 |
| 1,358,637 | Herron | Nov. 9, 1920 |
| 1,553,508 | Cloud | Sept. 15, 1925 |
| 2,015,329 | Anderson | Sept. 24, 1935 |
| 2,018,259 | Hartley | Oct. 22, 1935 |
| 2,036,734 | Kehl | Apr. 7, 1936 |
| 2,341,751 | Willoughby | Feb. 14, 1944 |
| 2,394,775 | Hilstrom et al. | Feb. 12, 1946 |
| 2,429,686 | Helmkamp | Oct. 28, 1947 |
| 2,504,171 | Anderson | Apr. 18, 1950 |

FOREIGN PATENTS

| Number | Country | Date |
|---|---|---|
| 201,483 | Germany | Sept. 11, 1908 |
| 421,603 | Germany | Nov. 23, 1925 |
| 438,303 | Germany | Dec. 15, 1926 |
| 501,146 | Germany | June 30, 1930 |
| 549,923 | Great Britain | Dec. 14, 1942 |